United States Patent [19]

Svoboda

[11] 4,184,066
[45] Jan. 15, 1980

[54] HEAT RADIATION REFERENCE SOURCE FOR PHOTOTHERMOMETRY

[75] Inventor: Jan Svoboda, Ostrava-Poruba, Czechoslovakia

[73] Assignee: Vyzkumny ustav hutnictvi zeleza, Dobra, Czechoslovakia

[21] Appl. No.: 815,431

[22] Filed: Jul. 13, 1977

[30] Foreign Application Priority Data

Jul. 13, 1976 [CS] Czechoslovakia ............... 4633/76

[51] Int. Cl.$^2$ ............................................. H05B 3/00
[52] U.S. Cl. ................................. 219/354; 219/34.6; 219/355; 219/553; 250/493
[58] Field of Search ............... 219/339, 342, 352, 353, 219/354, 411, 553, 552; 250/252, 493, 494, 495, 503, 504; 313/274

[56] References Cited

U.S. PATENT DOCUMENTS

| | | | |
|---|---|---|---|
| 1,768,519 | 6/1930 | MacLagan | 250/493 |
| 2,784,335 | 3/1957 | Munday | 250/493 |
| 3,100,828 | 8/1963 | Jacobs et al. | 250/493 |
| 3,138,697 | 6/1964 | Banca et al. | 250/493 |
| 3,205,343 | 9/1965 | Bell et al. | 250/493 |
| 3,419,709 | 12/1968 | Bell | 219/553 |
| 3,536,919 | 10/1970 | Newman | 219/553 |
| 3,602,693 | 8/1971 | Grounner | 219/354 |
| 3,694,624 | 9/1972 | Buchta | 219/553 |
| 3,702,391 | 11/1972 | Wellnitz et al. | 219/553 |

FOREIGN PATENT DOCUMENTS

1078794 11/1954 France ...................... 219/354

*Primary Examiner*—Roy N. Envall, Jr.
*Assistant Examiner*—Bernard Roskoski

[57] ABSTRACT

A reference source of heat radiation for the contactless measuring of temperature by photothermometry. The source includes a heat-radiating target connected with an electrically-heated ceramic heating element arranged in a protective guard. The guard is provided with a hood which protects the target from the incidence of light from the observed object, the temperature of which is being measured.

4 Claims, 3 Drawing Figures

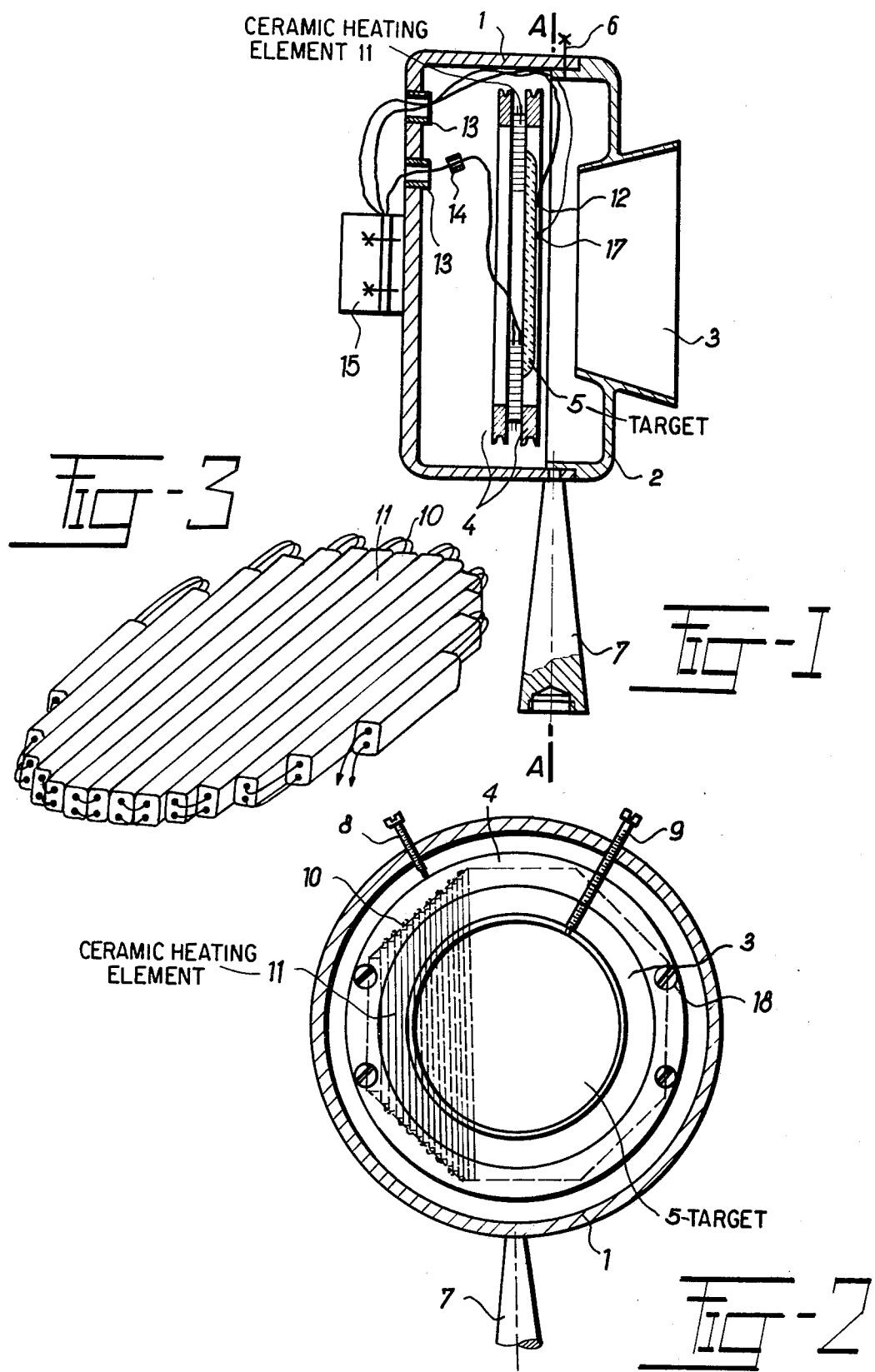

HEAT RADIATION REFERENCE SOURCE FOR PHOTOTHERMOMETRY

The invention relates to a heat radiation reference source which is used in the contactless measuring of temperature by means of a comparison method.

In photothermometry, in which the distribution of temperatures on an observed object is studied with the use of photographic methods, it is necessary to photograph the observed object and the source of the heat radiation of a known temperature in the field of the same film negative. Upon comparison of the photographed reference source of known temperature and the observed object of unknown temperature, it is possible to determine the unknown temperature of the observed object by means of the photometric measuring of the degree of blackening of the film layer of the two objects shown on the film. Until now this measuring has been carried out in a laboratory manner with the use of a calibrated flat-filament lamp for which the temperature of the filament has been determined by the manufacturer of the lamp for each intensity of the permitted feed current. The disadvantages of this lamp lie in the fact that the dimensions of its filament are too small, i.e., on the order of a few square millimeters, and for this reason it is not possible to compare objects which are more than ten times larger than the area of the lamp filament. Other disadvantages of these lamps are that the lamps are quite extensive and cannot be used reliably under operational conditions because of their shock sensitivity.

The above-described disadvantages may be removed by using the reference source of heat radiation for the contactless measuring of temperature according to the invention. The reference source of the invention includes a heat-radiating target connected with an electrically heated ceramic heating element arranged in a protective guard, the latter being provided with a diaphragm which limits the incidence of light from the outer source upon the heat target.

The advantages of the reference source of heat radiation according to the invention lie in the fact that it permits the contactless measuring of the surface temperature of the object with high accuracy, and that it has a large area on the radiating target which is uniformly heated to the same temperature; the area of the latter may be seleted as need be. Another advantage is its small mass so that the apparatus may be easily transported and used.

In the drawings:

FIG. 1 is a view of an examplary embodiment of heat reference source in accordance with the invention, the view being partially in longitudinal section and partially in elevation, the ceramic heating element being shown in elevation.

FIG. 2 is a view in transverse section taken along the line A—A in FIG. 1,

FIG. 3 is a view in perspective of the heating element.

The apparatus has a cup-shaped housing or protective guard 1 having forwardly open (to the right in FIG. 1) side walls and a rear wall extending transverse to said side walls. The reference source of heat radiation consists of a radiating target 5 in the form of a forwardly facing (to the right) flat plate disc, made of refractory material, with two accurate measuring thermocouples 12 and 17 attached thereto, the target 5 being disposed parallel to the rear wall of the housing and transverse to the side walls thereof. The lead wires of the thermocouples are so thin that the surface temperature of the radiating target 5 will not be influenced due to heat removal by such wires. The radiating target 5 is held in position by set screws 9 (one shown) screwed into an annular ring 4 (FIG. 2). The ends of screws 9 are pointed and the sides of the points push the radiating target 5 against a system of ceramic elements 11 so that no disturbing air gaps may arise between the system of the ceramic elements 11 and the radiating target 5. The screws 9 pass freely through holes in the side walls of the cup-shaped housing or protective guard 1 and enable the displacement of the radiating target 5 in its plane with respect to the ring 4 even after the whole reference source has been assembled so that it is possible to find its most advantageous position to guarantee the distribution of a uniform temperature all over its area.

The system of ceramic elements 11 are made of insulating tubings, advantageously of oval double-capillaries. A heating coil of resistance wire 10 is led through such system of ceramic elements 11, the heating coil being connected to a source of electric current such as a control transformer or to any other suitable source of electric current. The system of ceramic elements 11 is clamped between two identical annular rings 4 by means of screws 18 and is held in a central position by screws 8 screwed into the side wall of the housing 1. The inner ends of screws 8 have points which fit into a peripheral groove or one of the annular rings 4, screws 8 holding the described assembly of rings 4, heating element 11, and target 5 in the housing with a minimum of thermal losses. The screws 8 permit the adjustment of the assembly transversely of the side walls of the housing.

The housing 1 is provided with a cover 2 with a hood 3 which shields the radiating target 5 from outer light which might otherwise fall upon the radiating target 5. The hood 3, which presents a radiation-passing opening therethrough which is aligned with the center of the exposed broad surface of target 5, protects the target 5 from radiation from the observed object, which is disposed to one side of the target. The cover 2 is held on the protecting guard 1 by means of a holding screw 6. The protective guard 1 is also provided with electrically-insulating bushings 13 which serve, on the one hand, for passing the current supply line to the heating coil 10 and, on the other hand, serve for passing the individual branch wires of identical thermocouples 12 and 17, one of which serves for the measuring of the surface temperature of the radiating target 5, while the other is designed for the automatic control of the temperature of the target, if need be. The wires of thermocouples 12 and 17 and the lead wires to the heating coil 10 may be protected against contact with the chassis of the reference source by means of insulating beads of which one is shown at 14. The ends of the lead-in wires to the thermocouples and the heating coil are clamped in a terminal box 15 fixed to the protective guard 1 by screws 16. The reference source of heat radiation is provided with a stand 7, by means of which it may be fixed to a common tripod or to any other required support. It is to be noted that the assembly of the target and its heating means is disposed deep within the protective guard, that the hood projects from the forward end of the guard, and that the forward end portion of the guard is impervious to light except for the light-passing opening surrounded by the hood.

The reference source of heat radiation according to the invention may be used, e.g., for the calibration of radiating pyrometers, i.e., often during operation, without the necessity of dismounting the tested sensing unit. Such calibration may be carried out in a relatively short time, not exceeding 30 minutes. The reference source may thus replace expensive calibrating furnaces. It may also be used for photothermography and/or as a comparison source for the study of radiating coefficients of various kinds of materials, or of materials with different surface finishes, and the like.

Although the invention is illustrated and described with reference to a single preferred embodiment, it is to be expressly understood that it is in no way limited to the disclosure of such a single preferred embodiment, but is capable of numerous modifications within the scope of the appended claims.

What is claimed is:

1. A reference source of heat radiation for the contactless measuring of an observed object by photothermometry, comprising a cup-shaped housing having forwardly open side walls and a rear wall standing transverse to said side walls, a forwardly facing flat heat-radiating target made of refractory material disposed transverse to the side walls of the housing intermediate the axial length of the housing, a flat heating block disposed parallel to the radiating target and spanning the central portion of the housing, means for clamping the rear surface of the target tightly against the forward surface of the heating block, means for heating the heating block, the target and the heating block forming an assembly, means for adjusting the assembly transversely of the side walls of the housing, means for adjusting the target in its plane with respect to the clamping means, a light impervious shielding cover on the forward end of the housing, and a centrally disposed radiation-limiting hood mounted on the cover and presenting an opening therethrough aligned with the target.

2. The apparatus according to claim 1, wherein the means for adjusting the assembly transversely of the side walls of the housing is mounted on the side walls of the housing, and the means for adjusting the target in its plane with respect to the heating block is mounted on the clamping means.

3. The apparatus according to claim 1, wherein the means for heating the heating block comprises an electrical resistance winding embedded therein.

4. The apparatus according to claim 1, comprising a thermocouple for sensing the temperature of the target.

* * * * *